Nov. 13, 1928.  
J. A. McELROY  
SHOCKER  
Filed March 30, 1923

INVENTOR  
*James A. McElroy.*  
BY  
ATTORNEY

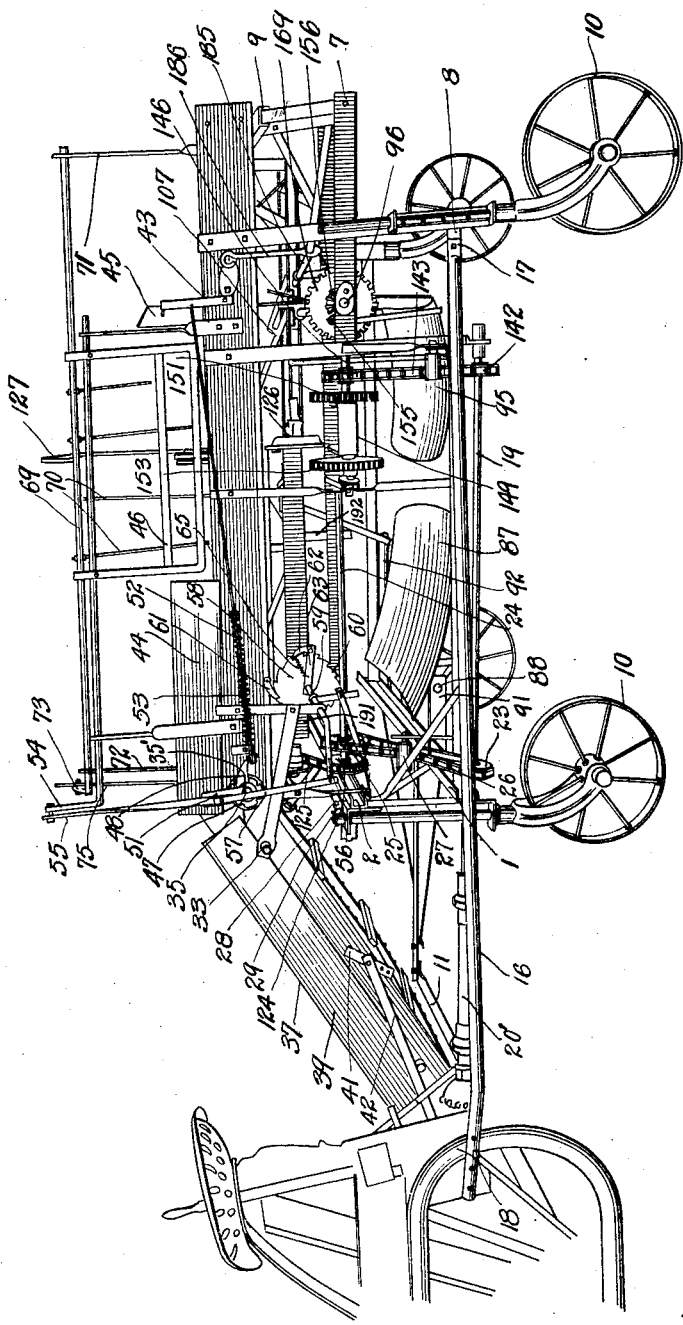

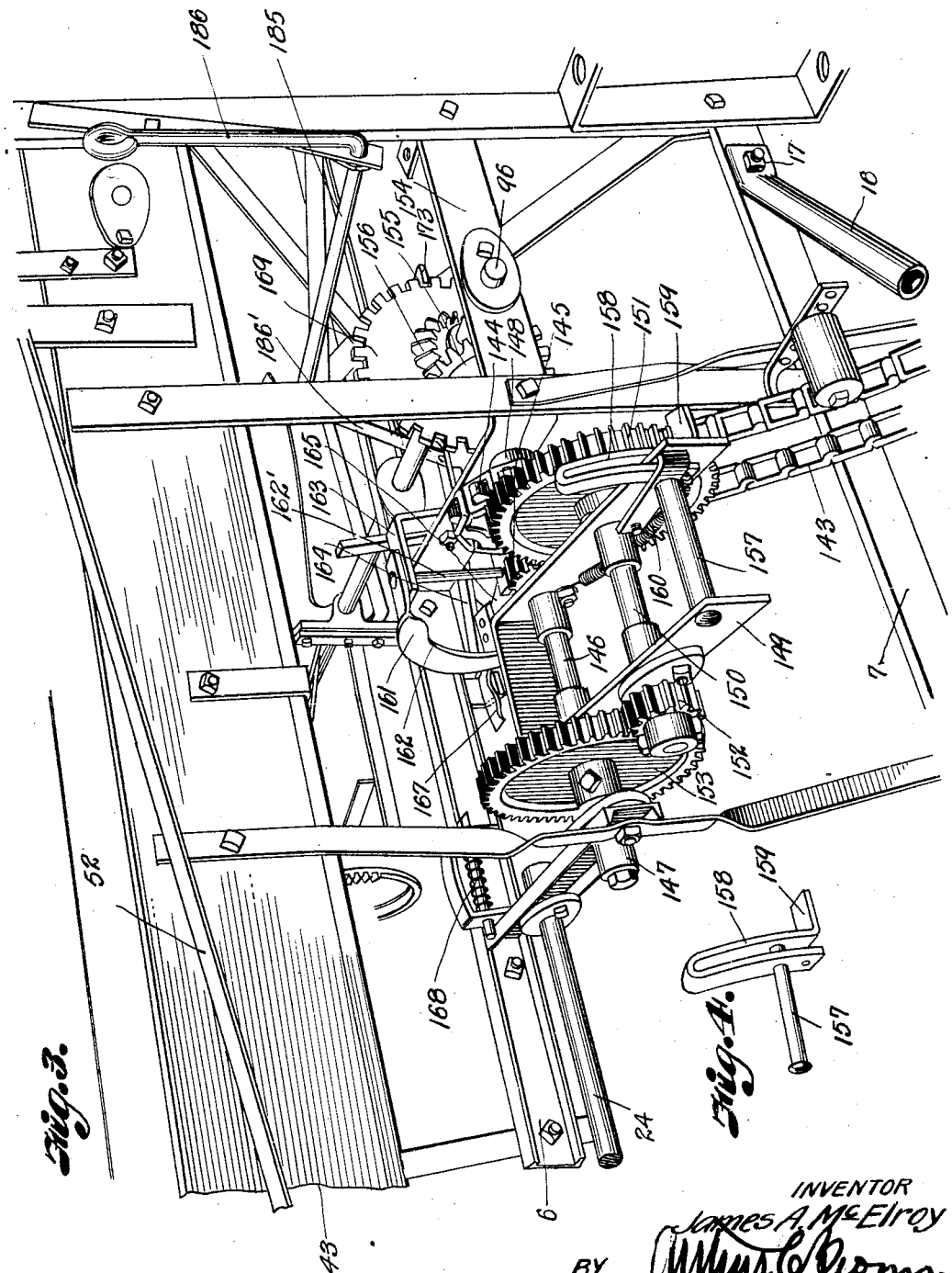

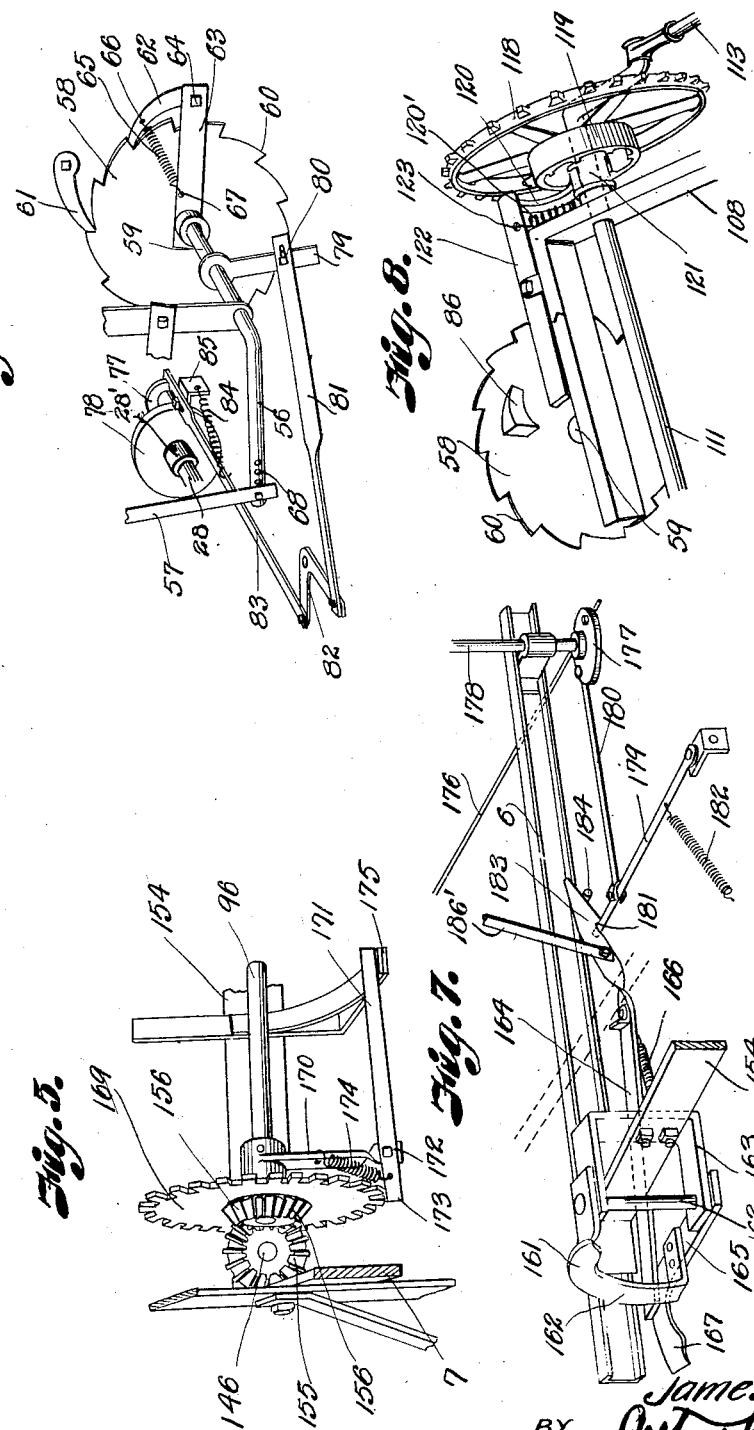

Nov. 13, 1928.　　　J. A. McELROY　　　1,691,355
SHOCKER
Filed March 30, 1923　　　12 Sheets-Sheet 5
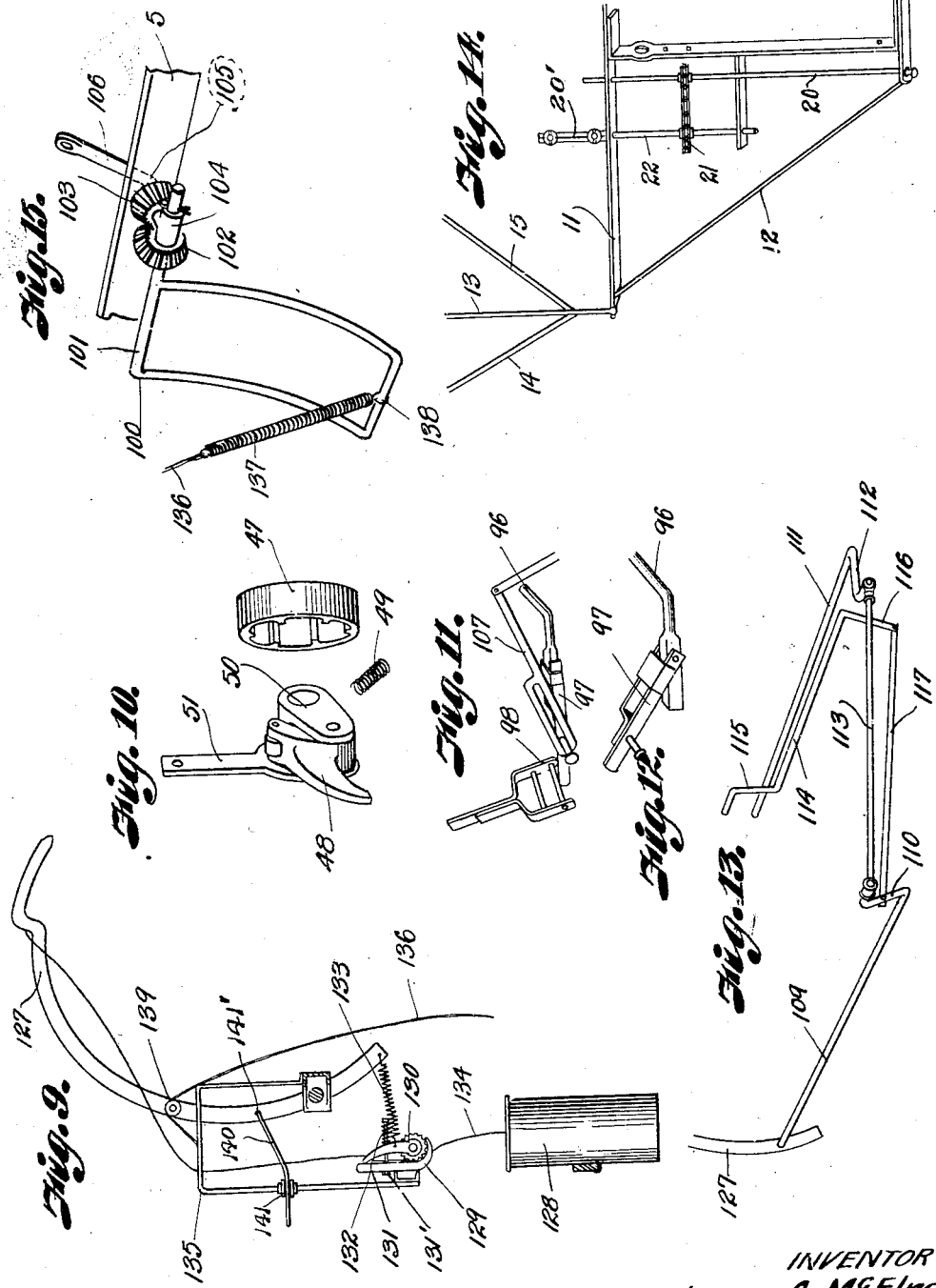
INVENTOR
James A. McElroy
BY Arthur C. Brown
ATTORNEY Nov. 13, 1928.
J. A. McELROY
1,691,355
SHOCKER
Filed March 30, 1923    12 Sheets-Sheet 6
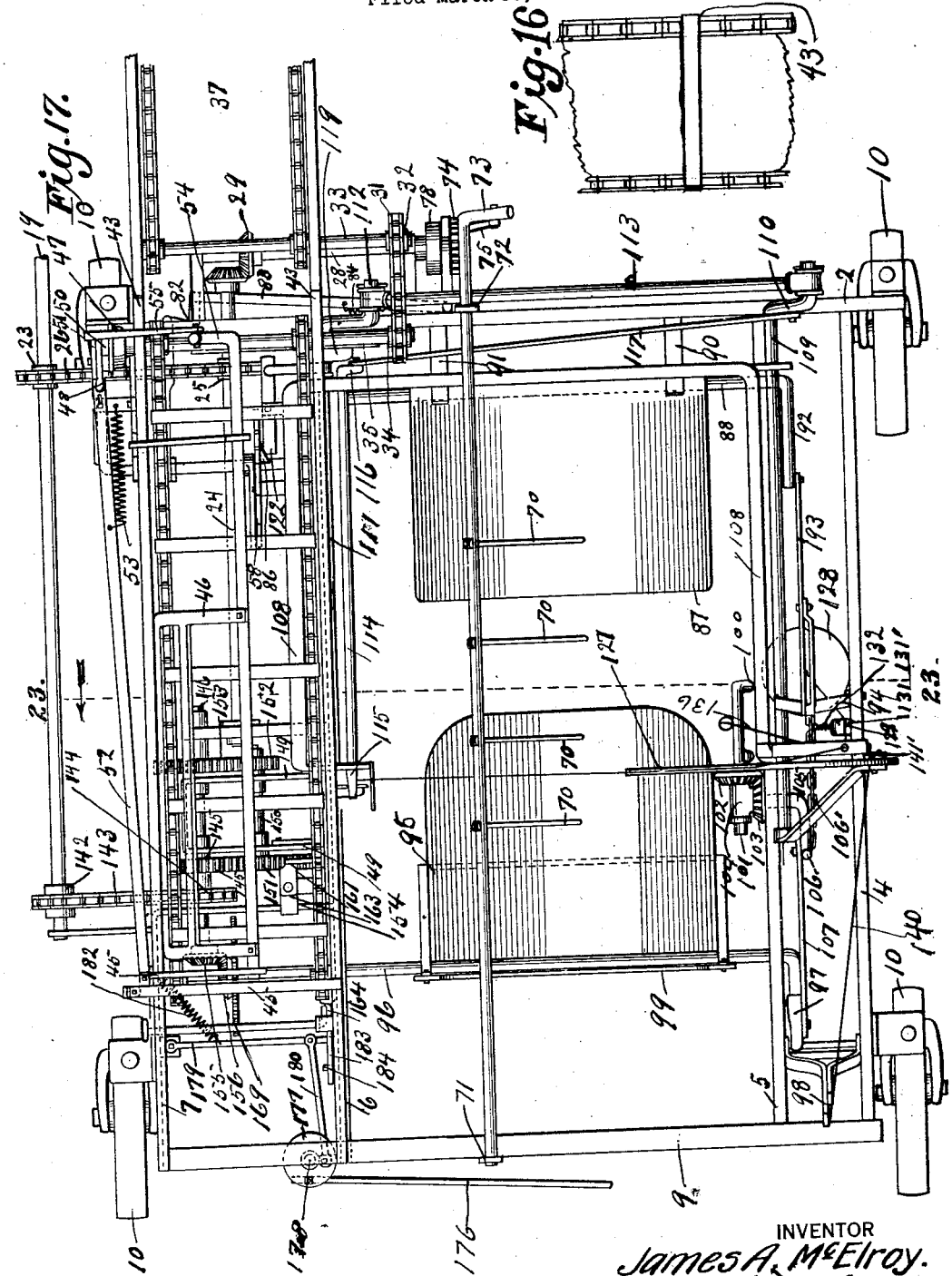
INVENTOR
James A. McElroy.
BY
ATTORNEY

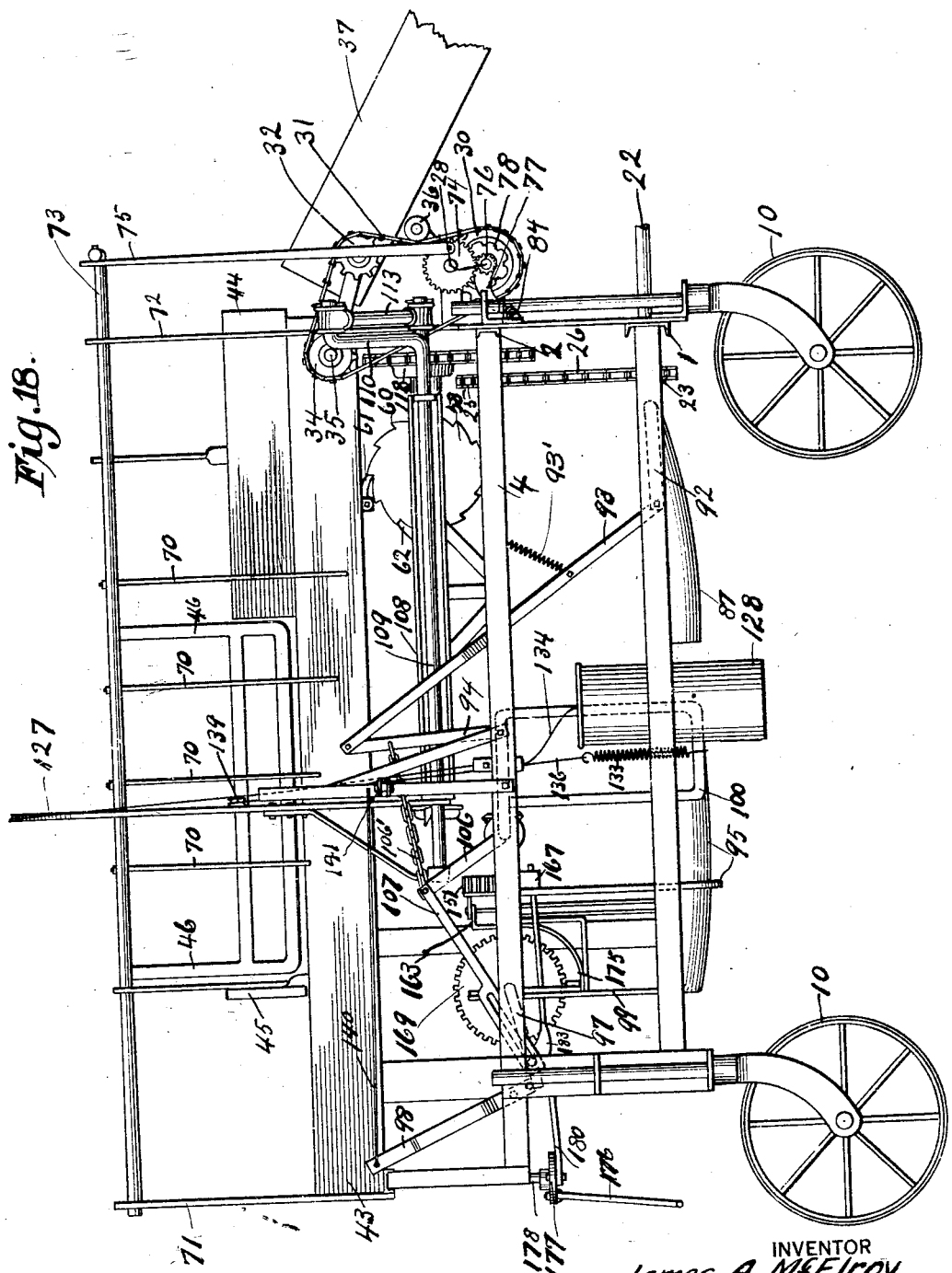

Nov. 13, 1928.
J. A. McELROY
1,691,355
SHOCKER
Filed March 30, 1923    12 Sheets-Sheet 8
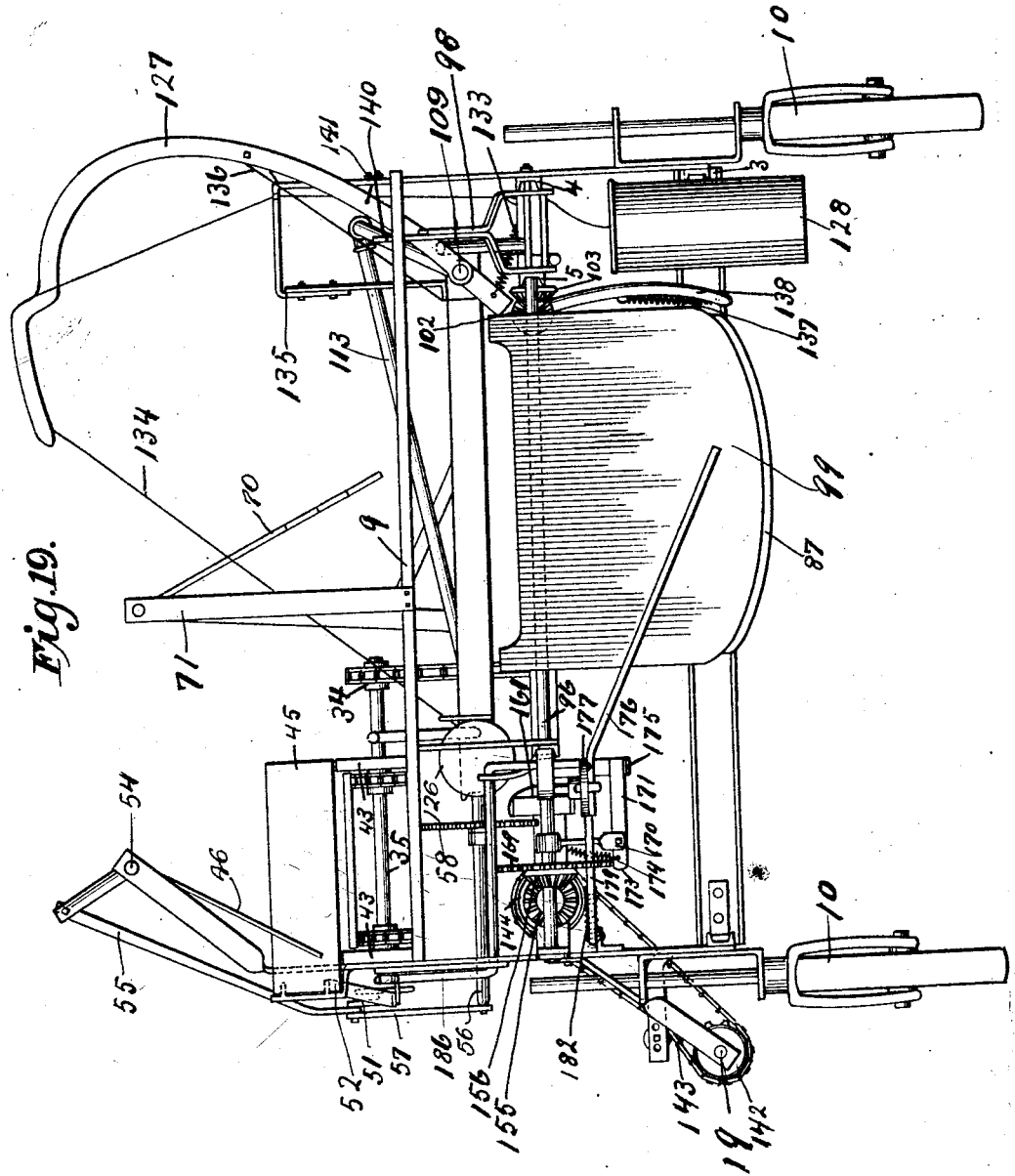
Fig.19.
INVENTOR
James A. McElroy
BY
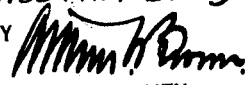
ATTORNEY Nov. 13, 1928.
J. A. McELROY
SHOCKER
Filed March 30, 1923
1,691,355
12 Sheets-Sheet 9
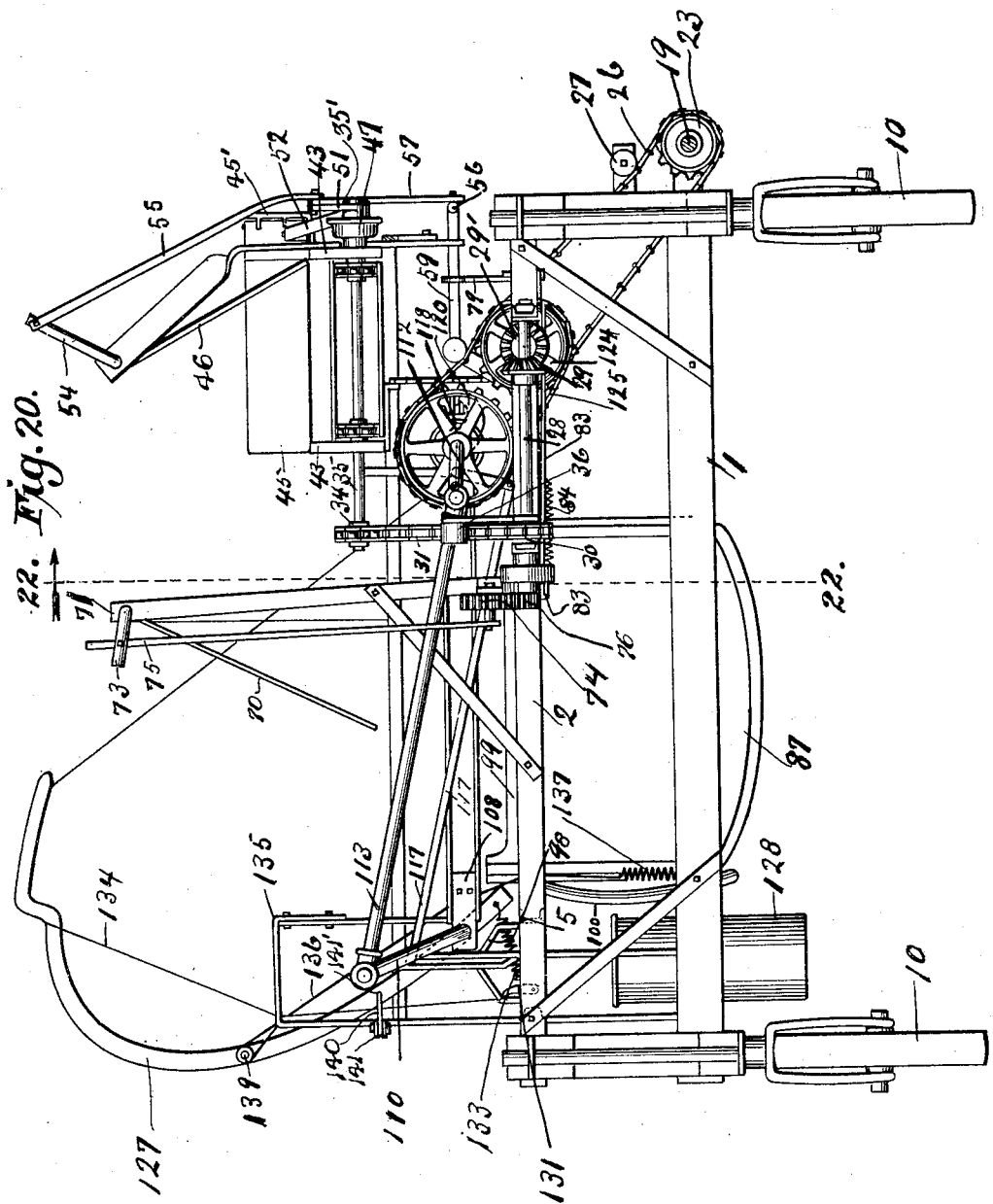
INVENTOR
James A. McElroy
BY
ATTORNEY Nov. 13, 1928.

J. A. McELROY

SHOCKER

Filed March 30, 1923    12 Sheets-Sheet 10

1,691,355

INVENTOR
James A. McElroy
BY
ATTORNEY

Nov. 13, 1928.  
J. A. McELROY  
1,691,355  
SHOCKER  
Filed March 30, 1923  
12 Sheets-Sheet 11
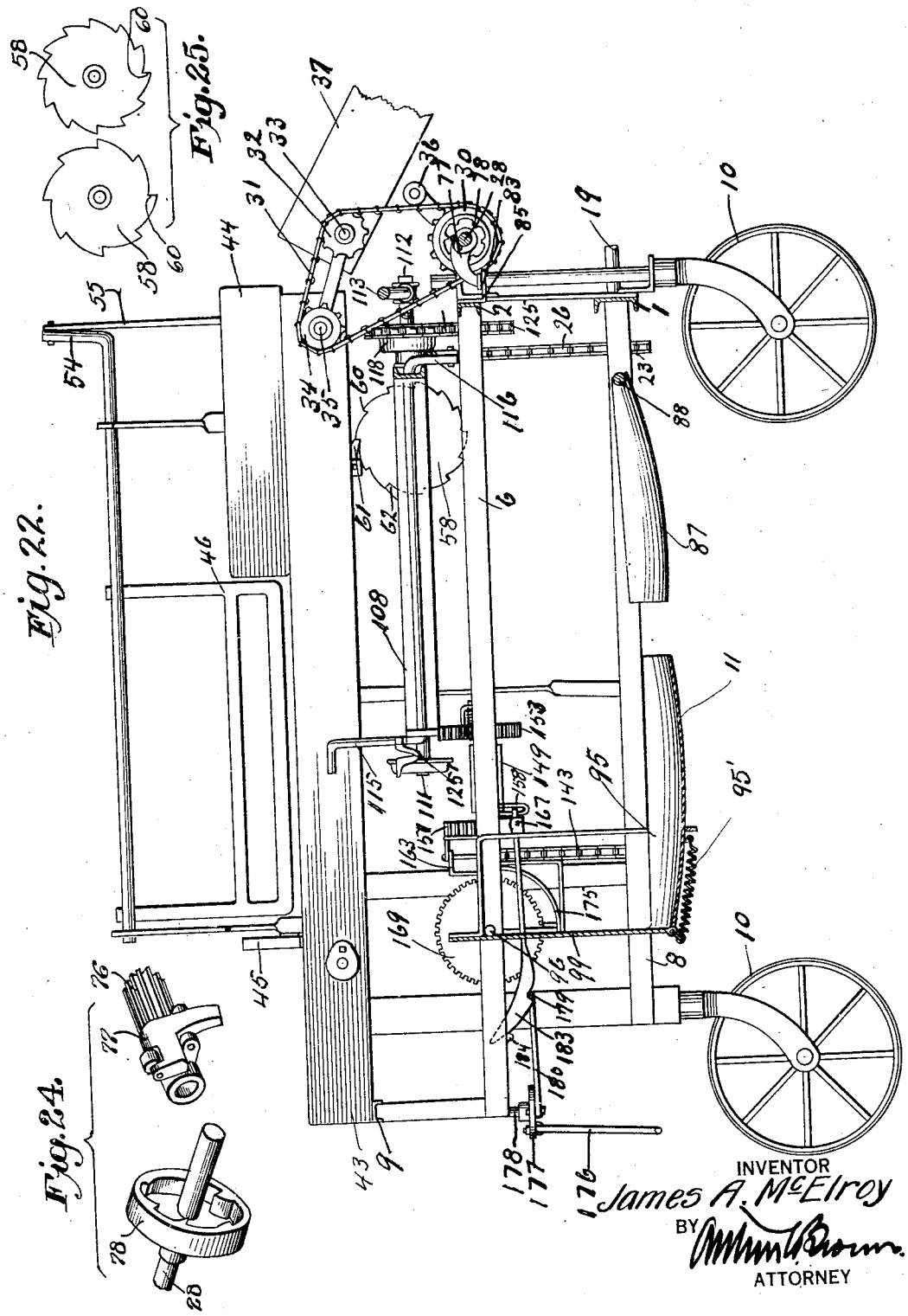
INVENTOR  
*James A. McElroy*  
BY  
ATTORNEY

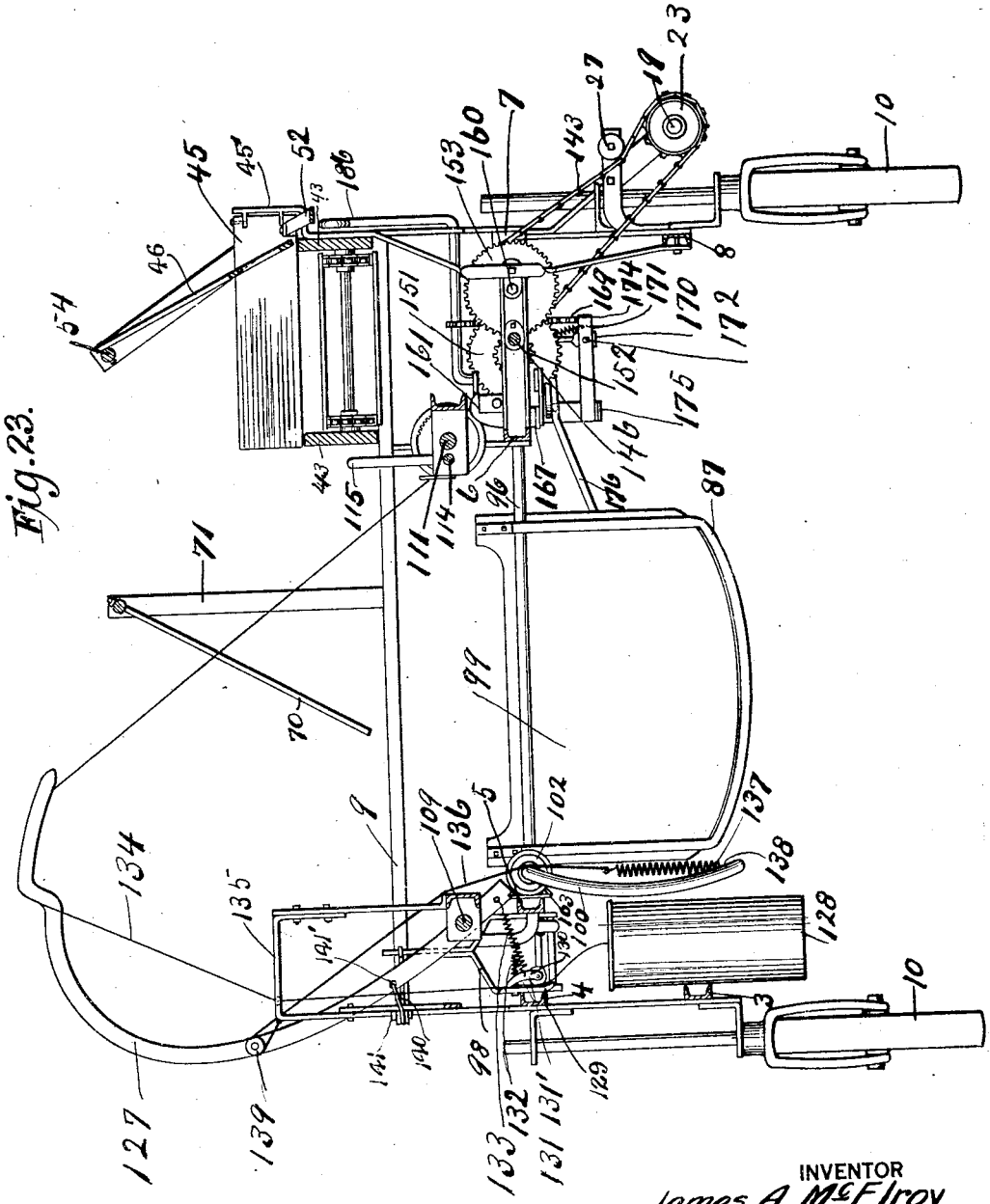

Patented Nov. 13, 1928.

1,691,355

UNITED STATES PATENT OFFICE.

JAMES A. McELROY, OF KANSAS CITY, MISSOURI.

SHOCKER.

Application filed March 30, 1923. Serial No. 628,788.

This invention relates to a shocker for grain binders and harvesters and the application is filed as a continuation in part of an application filed by me on December 13, 1920, Serial No. 430,435 and an application filed by me on May 14, 1921, Serial No. 469,685.

One of the objects of the invention is to provide a shocker to receive bundles of grain, form them into shocks and deposit them upon the ground with the heads uppermost. Means is provided whereby the shocks may be tied if desired after they are formed and before they are deposited upon the ground.

The invention also contemplates certain novel details of construction and novel arrangements of parts, all of which will be described hereinafter, reference being had to the accompanying drawings, in which Fig. 1 is a perspective view of the complete machine.

Fig. 2 is a perspective view of the machine.

Fig. 3 is an enlarged detail perspective view of the variable speed mechanism for shock upending and releasing mechanism.

Fig. 4 is a detail perspective view of a detent carried by the fast gear train.

Fig. 5 is a detail perspective view of the upender shaft wheel and latch.

Fig. 6 is a detail perspective view of the bundle-counting and bundle-spacing mechanism.

Fig. 7 is a perspective view of the variable speed trip stop for the shock upender and release.

Fig. 8 is a perspective view of the binder tier wheel, ratchet, trip dog and trip dog stop.

Fig. 9 is an enlarged view of the twine tension and outer shock compressor needle and twine can.

Fig. 10 is a disassociated view of the bundle "kick-in" mechanism and counting arm.

Fig. 11 is a detail view of the upender double-acting crank arm, butt holding and outer compressor controller and crank stop.

Fig. 12 is a side view of the double-acting crank arm.

Fig. 13 is a perspective view of the knotter shaft and arm, needle shaft and arm, and inner compressor shaft and arm and connections.

Fig. 14 is a plan view of the connections between the shocker and binder.

Fig. 15 is a detail view of the shock-forming member.

Fig. 16 is a fragmentary plan view of the conveyor.

Fig. 17 is a top plan view of the machine.

Fig. 18 is a far side view of the machine.

Fig. 19 is a rear end view of the machine.

Fig. 20 is a front view with the elevator removed.

Fig. 22 is a longitudinal sectional view on the line 22—22 of Fig. 20, and

Fig. 23 is a cross sectional view on the line 23—23 of Fig. 17.

Fig. 24 is a disassociated perspective view of the trip mechanism for operating the bundle distributor.

Fig. 25 is an elevational view of two of the counter wheels.

Figure 1:
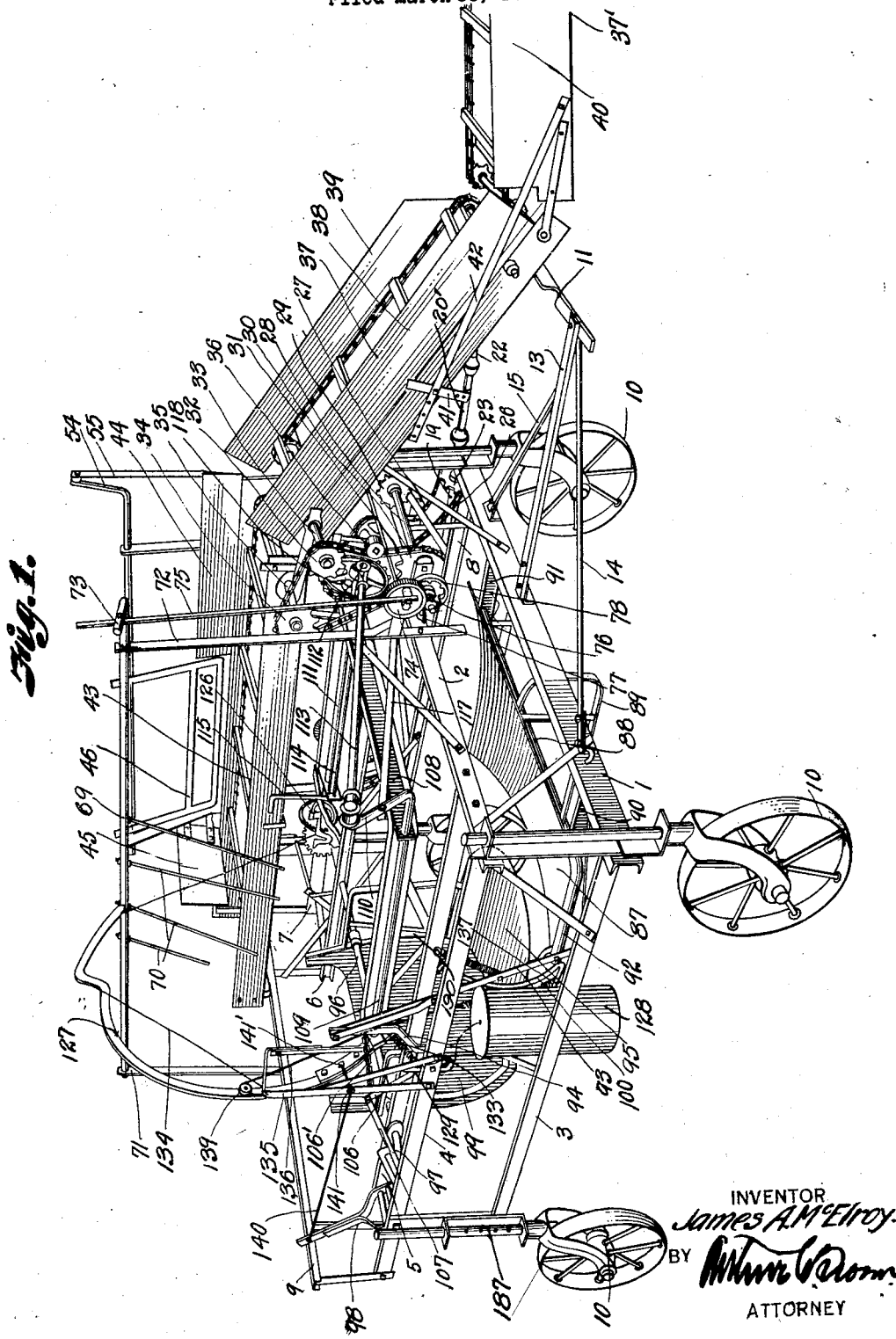
Figure 21:
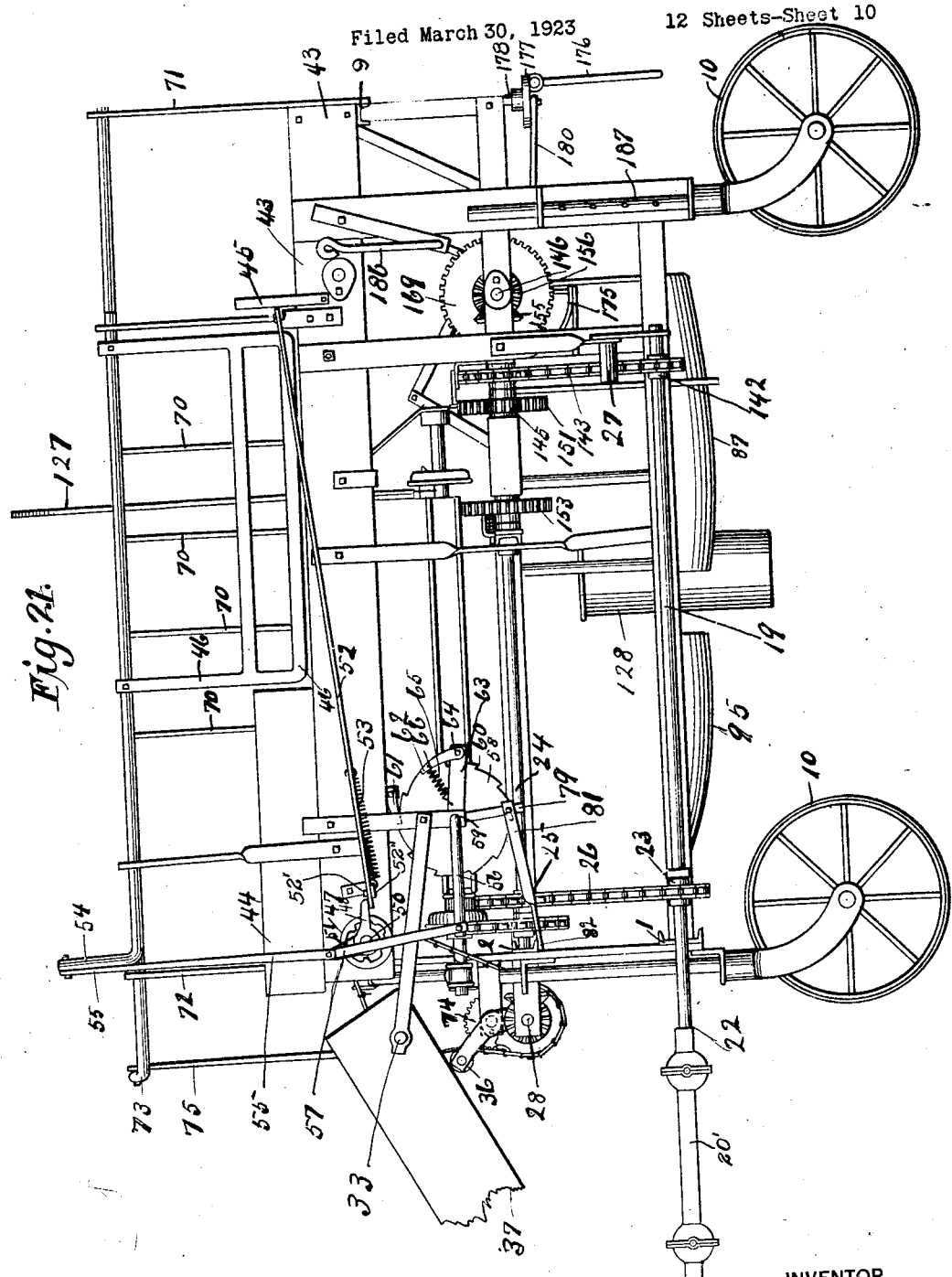
Fig. 21 is a near side view of the machine.

As illustrative of my invention I have shown the operating mechanism supported upon a frame comprising front channel bars 1 and 2 and side bars 3, 4 and 5 on one side, upper side bars 6 and 7 on the opposite side and a lower side bar 8. The side bars 4, 5, 6 and 7 extend rearwardly and have their rear ends connected by a cross bar 9, located above the main portion of the frame so an unobstructed space will be provided to permit the upender (later referred to) to function and so as to allow the shock to be released.

The frame is mounted upon caster wheels 10 conveniently located on the frame. Four are shown but obviously any convenient number may be employed.

I prefer to connect the machine frame to the binder so that the shocker will be pulled trailer-form behind the normal path of the bundle carrier of the binder, shocking along the path normally assumed by the bundle carrier, and to this end I provide the following draft rigging for the shocker.

To the binder frame is connected a bar 11, braced by a brace 12 (see Fig. 14). A stiff stub tongue 13 is connected to the bar 1 by braces 14 and 15 preferably by hinge connections, the stub tongue 13 (Fig. 1) being attached to the bar 11 by a loose connection to accommodate for travel of the shocker over uneven ground. The shocker is also flexibly attached to the binder by a brace 16, secured to a rear corner of the shocker, as at 17, and to the gooseneck 18 of the binder (see Fig. 2) for the purpose of holding the shocker frame in direct line with the binder. The power shaft 19 of the shocker receives its power from the pitman shaft 20 of the binder (see Fig. 14) through the chain and sprocket connection 21 with shaft 22, there being a universal slip joint connection 20' between shafts 19 and 22. All power for the shocker is delivered from shaft 19.

On shaft 19 is a sprocket 23 which drives a shaft 24 through the medium of a sprocket 25 and chain 26, the chain being held tight by a chain tightener 27.

At the front end of the shaft 24 is a transverse shaft 28 driven by beveled gearing 29 and 29' (Fig. 20). On shaft 28 is another sprocket 30 (Fig. 1) which drives a chain 31, driving a sprocket 32 on an elevator shaft 33, and said chain passes around sprocket 34 on the conveyor shaft 35, the chain being maintained taut by the chain tightener 36 (Fig. 20). The elevator 37 is provided with side walls 38, and 39, and consists of two sections which are adjustable for angularity through a bracket 41 and adjustable rod 42. The section 37' is provided with side walls 40 and it is adapted to be secured to the binder in any suitable way.

The horizontal bundle conveyor has a frame 43 which is fixed to the main frame and it is provided with a side board 44 to retain the bundles on the conveyor 43. The binder discharges the bundles upon the member 37' and the bundle passes from the conveyor 37' to the conveyor 37, endwise heads first, and then to conveyor 43.

The bundles are carried along the conveyor 43 until they contact with the hinged head board 45, whereupon the head board causes the kick-in wing 46 to throw them sidewise into the shock-forming mechanism, where they are compressed into shocks and preferably tied, preparatory to being shocked. The manner of operating the kick-in device is as follows:

Fast on the inner end of shaft 35 is a ratchet clutch member 47 consisting of a collar having teeth on its inner face (see Fig. 10). A trip dog 48 normally urged into engagement with the teeth by the spring 49 is mounted on a trip dog casting 50 provided with an arm 51. The casting 50 is loosely mounted on shaft 35 (Figs. 17 and 20), the casting being held against longitudinal movement on shaft 35 by a pin 35' (Figs. 2 and 20) which passes through the shaft, as will be well understood. 52 is a trip dog stop connected at one end to the head board 45 and guided at its opposite end on a pin 52' on a plate bracket 52'' mounted on the frame so that it is held in position for engagement with the trip dog 48. The board 45 extends across the upper conveyor and is hinged to an arm 45' fixed to the side board 43 of the conveyor frame. The spring 53 is connected at one end to the horizontal conveyor frame and to the trip dog at the other. The spring holds the trip stop in position to hold the trip dog stop stationary and out of engagement with the teeth of the ratchet clutch 47. When the heads of the bundles contact with the head board 45, the head board swings to impart a slight longitudinal movement to the stop 52 so as to release the trip dog 48, whereupon the spring 49 throws the trip dog 48 into engagement with the teeth of the ratchet clutch 47, clutching the casting 50 and member 47 together and since the shaft 35 is rotating, the arm 51 will make a complete revolution. The kick-in wing 46 has a crank 54 at one end which is connected to arm 51 by a link 55, so that as the arm 51 swings through the first 180 degrees of the circle, the wing 46 will swing toward the shock-forming mechanism and thereby "kick" the bundle off the conveyor into the shock-forming mechanism. Since the length of the wing is co-extensive with the length of the bundle, it will be apparent that the bundle will be prevented from losing parallelism with the longitudinal center of the machine during the time it is transferred from the conveyor. The arm 51 is also connected to counter shaft arm 56 (see Fig. 6) through the link connection 57 of a counting mechanism, consisting of a wheel 58 loose on a counter shaft 59. The wheel 58 is provided with teeth 60 adapted to be engaged by a detent pawl 61 and an actuating pawl 62. The pawl 62 is operated by an arm 63 fast on counter shaft 59. The pawl 62 is pivoted to arm 63 at 64 and it is normally urged into engagement with the teeth 60 by a spring 65 connected at 66 to the pawl 62 and to the arm 63. When arm 51 moves through the first 180 degrees of its movement, the wheel 58 is rotated. The wheel 58 has 12 notches for 12 bundles to a shock. Different wheels for different sized shocks are to be used instead of wheel 58, putting as many bundles in a shock as there are notches in the wheel. Therefore, by changing wheels the number of bundles to a shock will vary accordingly. If a twelve notch wheel 58 is to be used it will be set for 12 bundles to a shock, and the wheel 58 will have made one complete revolution when the twelfth bundle has been deposited into the shock-forming mechanism. Obviously, the wheel will make a complete revolution when the number of bundles for which the machine is set have been deposited into the shock-forming mechanism whether thirteen, twelve, eleven, ten, nine or any other number, dependent on how the machine is set.

Of course, it is to be understood that when the arm 51 has completed its first 180 degrees, the remaining 180 degrees of the swing will result in restoring the parts to their normal position.

I have shown a bundle-distributor which may not be essential under all conditions but where desirable it may be caused to operate so as to lay the bundles uniformly in the shock-forming mechanism in a novel manner.

The bundle distributor is shown as including a rock shaft 69 with depending fingers 70, the rock shaft being mounted in standards 71 and 72. The crank arm 73 is connected to a gear wheel 74 by a link 75. The gear wheel 74 is driven by gear 76 on shaft 28, carrying a stop dog 77 like that shown in Fig. 10 and numbered 48, minus the arm 51. The stop dog 77 may engage teeth on a clutch member 78 like 47 in Fig. 10, (see Figs. 6 and 22) the dog 48 being a left hand dog and the one designated 77 being a right hand dog. The clutches 47 and 78 are interchangeable depending upon whether they are to be driven right or left. The clutch member 78 is fast to shaft 28. The trip dog pinion 76 and trip dog 77 are fastened together but are loose on shaft 28, while the clutch member 78 is fastened on shaft 28 (see Fig. 1, Fig. 6 and Fig. 25).

The trip dog 77 is tripped by an arm 79 fast to shaft 59. The arm has a lost motion connection 80 with a link or bar 81 connected to an elbow lever 82. The elbow lever is connected to a trip dog stop 83 urged into functional position by a spring 84 connected to a bracket 85 and to the trip dog stop 83. When the arm 51 swings through an initial arc of 90 degrees, the arm 79 moves through the length of the slot of the lost motion connection 80, then the arm 79 moves the link 81 longitudinally, rocking the elbow lever 82 pivoted in the frame member 2 (Fig. 17) and imparting a longitudinal movement to trip dog stop 83 against the action of spring 84, withdrawing the end of the trip dog stop from engagement with the trip dog 77. The trip dog will then be thrown by its spring into clutching engagement with its complementary clutch member 78, turning the pinion 76 one revolution.

The gears 74 and 76 have a ratio of 6 to 1 so the gear 74 will be turned one sixth of a revolution, rocking the shaft 69 part of its throw to move the fingers 70 part of their throw so there will be three distinct positions of the fingers for the distribution of the bundles, it being understood that when the bundles are thrown from the conveyor, they will strike against the fingers and drop into the shock forming mechanism at different positions, side by side, dependent on the positions of the fingers.

On the last 180 degrees of rotation of the arm 51, the trip dog stop 83 will be restored to the position shown in Fig. 6.

When the counting wheel 58 has counted the desired number of bundles for the shock, it will have made a complete revolution, and the offset lug 86 on wheel 58 will trip the dog stop of the tying mechanism to be referred to hereinafter.

The shock-forming mechanism is constructed as follows:

87 is a shock butt holder consisting of a curved bottom plate mounted on a rock shaft 88 which carries plate supporting fingers 89, there being one shown in the middle of the shaft 88 but any number may be employed. The shaft is mounted in suitable bearing brackets 90 and 91, carried by the bar 1. The shaft 88 is provided with a crank arm 92 connected to the link 93 pivotally fastened to swing arm 94 supported by bars 4 and 5. The shock upender consists of a support 95 upon which the heads of the bundles rest, the butts resting upon the member 87. The member 95 is rigidly supported on and hangs from the shaft 96 in bearings in the main frame. On one end of the shaft 96 is a double-acting crank arm 97, adjacent to which is a crank arm stop 98 pivoted to bars 4 and 5 (see Fig. 17). 98' is a shock spring for butt holder and lifter link connected to link 93' and to a bar 4.

Loosely mounted upon the shaft 96 is a shock settling member 99 and it has its lower end yieldingly connected to the upending member 95 by a spring 95' suitably attached to the settling member 99 and to the upending member 95 (see Fig. 22). The shock settling member 99 co-operates with the upender 95 and settles the shock on the ground with the heads uppermost. The back end of the machine can be adjusted to raised position for higher grain by raising the rear end of the machine higher on the rear axles by locating keys in the holes in the pintles 187.

Mounted in the frame on the outside between the upending member and the butt holder is a shock-forming member 100 (Fig. 15), on shaft 101 carrying a beveled gear 102 which rotates about the beveled gear 103 fixed to the inside of the bar 5. The shaft 101 is loose in a T-connection 104. The T-connection is fixed on end of shaft 105 passing loosely through the gear 103, and shaft 105 carries a crank arm 106 connected to link 107 secured to double-acting upender arm 97. Crank arm 106 is also connected to the arm 94 by a chain 106'.

Carried by the main frame is a tier attachment frame 108. Mounted in the frame 108 is a needle shaft 109 and crank 110. 111 is a knotter shaft having a crank 112. The cranks 110 and 112 are connected by a link 113. 114 is an inner compressor shaft carrying an inner compressor arm 115. 116 is an inner compressor arm crank connected to arm 110 by a link 117, (Fig. 13). Idly mounted on shaft 111 is a ratchet clutch and tier wheel 118. Inside the clutch collar 119 is a trip dog 120 on a casting 121 fastened to the shaft 111, the dog being spring-retracted. The spring is designated 120'. Carried by the frame 108 is a trip dog stop 122 normally held in engagement with the trip dog by spring 123 and moved out of engagement by the lug 86 on the wheel 58. When the wheel 58 has made a complete revolution, the bundles are in the shock-forming mechanism so that the shock is ready to be tied. At this time, the lug 86 will trip dog-stop 122 and allow the dog 120 to move into clutch engagement with the collar 119, so that the collar 119 and wheel 118 rotate shaft 111, it being understood that the wheel 118 is constantly driven from shaft 24 through sprocket 124 and chain 125 (see Fig. 2 and Fig. 20). Since the shaft 111 is making a complete revolution, the knotter head 126, similar to a grain loader knotter head, is operated at the same time, and the needle 127 is actuated through the link 113 and shaft 109 to carry the twine to the knotter head. The twine is contained in a twine can 128 and passes through a twine tension member 129. The movable member 130 of the twine tension member is supported upon the stationary member 131 by a bolt 131' and is normally urged into tensioning position by the spring 132. When the needle 127 is in the position shown in Fig. 9, the tension member release spring 133 will hold the movable member in twine-releasing position, releasing tension on the twine as shown, but when the needle starts to move over to operating position, the spring 133 will permit the spring 132 to cause the tension to become effective. The twine 134 after passing through the tension member 129 is threaded through the frame 135 and through the needle.

The shock compressor consists of a flexible member 136 having one end connected to a spring 137 (Figs. 9, 15 and 20), fastened to the lower end of member 100 at 138 and to the top of the frame 135. The member 136 passes over the pulley 139 on needle 127 as the needle goes down. The shock compressor further consists of the inner compressor arm 115, which moves toward the needle. As the needle moves to functional position, it compresses the shock and when the needle enters the knotter head, the shock is compressed and tied. After the tying takes place, the needle continues a further movement to put tension on the cord or cable 140 to throw the crank arm stop 98 to unlatch the machine. It will be noticed that the cable 140 passes through a pulley 141 on frame 135 and is fastened to the needle at 141'.

When the machine is unlatched, the double-acting crank arm 97 is tripped, letting the butt holder release, dropping the butts to the ground and allowing the shock-former 100 to swing down and back out of the way of the shock.

On the power shaft 19 is a sprocket 142 which drives a variable speed shocking mechanism through the medium of a chain 143. The chain 143 continuously drives a sprocket 144 and pinion 145 which rotate together loosely on shaft 146. The shaft 146 is mounted in the bearings 147 and 148 on the main frame.

Mounted upon the shaft 146 is a swinging variable gear frame 149. The frame 149 is loose on shaft 146 so that it may swing about the axis of the shaft 146. The frame 149 carries a shaft 150 on one end of which is a larger gear 151 meshing with the pinion 145 so that when the pinion rotates, the shaft 150 will rotate. On the end of the shaft 150 distant from gear 151 is a pinion gear 152 which, in turn, meshes with the gear 153 fixed on shaft 146. The gears 151, 152 and 153 are reduction gears which drive the shaft 146 at reduced speed as compared with the pinion 145. The main frame carries a fixed gear frame 154 in which certain shafts are mounted (see Figs. 3 and 7). On one end of the shaft 146 is a beveled gear 155 which meshes with a beveled gear 156 on upender shaft 96. Carried by the bolt 157 on frame 149 is a gear latch 158 having a tooth 159 adapted to engage between the teeth of gear 151 when the latch spring 160 functions, it being seen in Fig. 3 that the spring 160 is fastened to the latch and to a frame 149. The tooth 159 is longer than the width of the gear 151 so that its free end projects slightly beyond the gear, the projecting end being adapted to strike against the finger 161 of the latch throw out 162, pivoted to the clevis 163. The clevis 163 is fastened rigid to frame 154. A trip stop and latch link 164 is pivoted to the L-shaped bar 165 which supports the throw out 162, and the trip stop and latch link 164 is normally urged in one position by the spring 166, having one end fastened to the member 164 and the other to the frame 154. The limb 167 of the member 165 serves as a stop for the frame 149 when it swings to slow speed position or the frame 149 is in a horizontal plane as shown in Fig. 2. When in the slow speed position, the latch 158 is out of engagement with the gear 151 because the free end of the tooth 159 is held away from the gear 151 by the throw out 162. When the frame 149 is in the position just described, it is held against back action by the spring bolt 168 which engages over the top edge of the frame 149. The frame 149 is now held between the bolt 168 and the stop 167 so that it cannot swing in either direction until it is released. It will be so held until it is released by mechanism to be hereinafter described.

By reference to Fig. 5 it will be observed that the gear 156 carries a clutch wheel 169 and that both are at times loose on the shaft 96 but at determined intervals the gear 156 is made fast to the shaft 96 so that the shaft 96 can be driven from the shaft 146. Mounted rigidly on the upender shaft 96 is a latch or clutch carrying arm 170 which is longer than the radius of the clutch wheel 169 and the arm 170 carries a clutch latch 171 which is pivoted intermediate its ends at 172 to the end of the arm. The latch 171 has a toe 173 adapted to engage the teeth of the wheel 169 under the action of the spring 174 but it is normally held out of engagement with the wheel by a latch stop member 175 which is rigid on the frame 154.

The spring 174 is fastened to the toe of the latch and the arm as shown in Fig. 5. When the shock is compressed and tied and the trip 98 is actuated to release the shock to permit the butts to drop to the ground, the upender shaft begins to rotate under the action of the shock upender as it drops. When the shaft 96 moves slightly, the heel of the member 171 will move off the stop member 175, allowing the spring 174 to cause the toe 173 to engage the wheel 169. Then the shaft 96 will be driven at the same speed as the shaft 146, upending the shock slowly relative to the forward travel or movement of the binder. When the shock is on end with the heads upstanding, it is desirable to get the upender away from the shock so that danger of knocking the shocks down will be eliminated.

There are various ways of accomplishing this but for convenience I have shown a simple means of causing the variable speed mechanism to operate to increase the speed of the shock upender on shaft 96.

Referring to Fig. 7 it will be observed that an arm 176 is rigid on disk 177 loose on shaft 178 and adapted to partially rotate the disk. The disk is connected to a trip rod 179 by a link 180 so that when the disk moves about the axis of the shaft 178, it will rock the rod 179. The disk is rotated by the pressure of the arm 176 against the butt end of the shock when the shock is on end. The rod 179 engages a notch 181 in the end of the trip stop link 164 so that when a pull is exerted upon the link 180, the rod will impart a longitudinal movement to the member 164 so as to move trip stop 167 out of the path of the trip latch throw out 162 and out of the path of tooth 159, members 162 and 167 hinging upon the pin 162' of the clevis 163. Therefore, the spring 160 will cause the tooth 159 to engage between the teeth of the gear 151 and lock rigid with the frame. Therefore, the pinion gear 145 will swing the entire frame 149 downward to cause it to rotate about the shaft 146 at increased speed, fast enough to carry the upender away from the shock at a rapid rate, leaving the heads of the shock upstanding. The frame 149 will continue to rotate until it again contacts with trip stop 167 when the bolt 168 will slip over the top edge to prevent back action as above explained. When the frame comes into contact with trip stop 167, the tooth 159 will be thrown out of engagement with the gear 151 by finger 161 so that the reduction gear may now function.

When the arm 176 has moved past the shock, the rod 179 will be retracted by the spring 182 so that it may re-engage the notch 181, it being understood that when the member 164 was pulled by the rod 179, the end 183 rode upon the pin 184 to permit it to disengage the rod 179 so that it in turn could be retracted by the spring 166 to be in position to stop the frame 149 when it had made a complete revolution. One end of the spring 182 is fast to the rod 179 and the other to the cross bar 154 carried by bars 6 and 7 (Figs. 7 and 17).

It is sometimes desirable to cut the fast speed means in by hand and to this end I have shown a manual means for controlling the change speed gearing. This is shown in Fig. 3 as a rocking shaft 185 with arms at both ends, one being shown at 186 and the other at 186'. A rope or cable can be attached to one arm 186 and the fast means cut in when the shock is on end by rocking the shaft so that one end will operate trip stop link 164.

From the foregoing it will be seen that the bundles can be deposited from the binder on the elevator which carries them to the horizontal conveyor with the heads pointing rearwardly. The bundles are carried along the horizontal conveyor until the heads strike the board or gate at the rear of the conveyor. Contact of the bundles with the trip or board at the end of the horizontal conveyor causes it to trip the mechanism for permitting the kick-in at the side of the conveyor to kick the bundles off the horizontal conveyor into the shock-forming and compressing mechanism. The bundles continue to be thrown or kicked into the shock-forming mechanism until the requisite number of bundles has been deposited in the shock-forming mechanism in accordance with the number for which the counting mechanism has been set. As the bundles are kicked into the shock-forming mechanism, they are distributed by the distributor arm so that a uniform, symmetrical shock will be provided.

When the requisite number has been received by the shock-forming mechanism, the shocks are compressed, settled and tied. The shock-forming mechanism is then released so that the upender will upend the bound bundles to shocked position with the butt ends on the ground and, therefore, with the heads uppermost and as above explained, liability of the shocks being knocked down by the upender will be eliminated because at the proper time the swinging movement of the shock upender is increased so that the shock upender can get away from the shocks fast enough to prevent its knocking the shocks down as the binder and shocker travel over the ground. This is done, of course, by the slow and fast speed mechanism which I have generically referred to as the variable speed mechanism.

It will, therefore, be seen that the forming of the bundles into shocks, upending and leaving them in proper position on the ground is automatic and that it is performed by novel mechanism.

For certain of the shafts I have provided self-aligning bearings by cutting holes in the main frame and introducing the bearings through the hole so that there will be play enough to allow the bearings and shafts to be self-seating. The main frame extends back of the upender far enough to give clearance for the movement of the upender and clearance for the shock, the rear cross channel tying the rear end of the frame.

The frame 108 supporting the tying mechanism is shown as supported upon a three point suspension from the main shocker frame, the far side of the frame 108 being supported from the bar 105 at one point by a bracket 190 (Fig. 1) and the rear side at two points by rail 2 at 191 and strap 192 secured to the bar 6 (Fig. 2), thus allowing flexibility of the connections for the most efficient operation. For the purpose of this description, it is to be understood that the near-side of the machine is next to the grain and the far-side is furthest from the grain.

In order to convey a comprehensive idea of the invention I have described the various parts in detail but it is to be understood that the disclosure in this application is merely illustrative of the generic conception of the invention and I, therefore, reserve the right to make changes in form, proportion and minor details of construction without departing from the spirit of the invention or sacrificing any advantages thereof.

What I claim and desire to secure by Letters-Patent is:

1. A sheaf shocker comprising a frame, a shock forming mechanism carried thereby, a conveyor mechanism for delivering the bundles from the binder to the shock forming mechanism endwise, means for obstructing the movement of the bundles and means for conveying the bundles sidewise into the shocker.

2. A sheaf shocker comprising a frame and a shock forming mechanism carried thereby, a conveyor mechanism for delivering the bundles endwise and means for discharging the bundles sidewise into the shocker.

3. A sheaf shocker comprising a main wheel-supported frame, mechanism carried by the frame for receiving bundles of grain from the binder, forming them into shocks and then upending them upon the ground, a tier attachment for tying the bundles together including a second frame, and means for mounting the second frame to the first, said means comprising a one-point suspension on one side of the second frame and a plurality of suspension points on the other side of the second frame.

4. A sheaf shocker comprising a frame and a shocking mechanism including a butt holder and upender, a conveyor for receiving the bundles of grain endwise with the heads first from the binder, and a kick-off device for throwing the bundles from the conveyor into the shocking mechanism with the heads on the upender and the butts on the butt holder.

5. A sheaf shocker comprising a frame and a shock-forming mechanism carried thereby, a conveyor mechanism for delivering the bundles from the binder to the shocker with the head ends first, means for obstructing the movement of the bundles, and means for discharging the bundles sidewise from the conveyor mechanism into the shocker.

6. A sheaf shocker comprising a frame and a shock-forming mechanism carried thereby, a conveyor mechanism for delivering the bundles from the binder to the shocker with the head ends first, means for obstructing the movement of the bundles, and means for discharging the bundles sidewise from the conveyor mechanism into the shocker, said last-named means being under the control of the obstructing means.

7. A sheaf shocker for binders comprising a frame, a shock-forming mechanism carried thereby, means for delivering the bundles of grain from the binder to the shocker heads first, a shocker head board against which the bundles may move during their delivery to the shocker, and means for throwing the bundles sidewise into the shock-forming mechanism.

8. A sheaf shocker comprising a frame, shock-forming means carried by the frame, a conveyor mechanism for delivering bundles of grain endwise, a kickoff device for throwing the bundles of grain sidewise into the shock-forming means, a tier mechanism operable in connection with the shock-forming means to tie the shock, and means for depositing the shock upon the ground with the heads uppermost.

9. A shocker for binders comprising a bundle delivery elevator, a conveyor to receive the bundles from the elevator, a shock-holding means, a changeable speed shock upender, a shock settler, a shock tier, and a shock compressor co-operating therewith, and means for automatically changing the speed of the shock upender when the shock has been upended.

10. A sheaf shocker including a frame, shock-forming and holding mechanism carried by the frame, a tier attachment including a needle arm, means operating the needle arm, and a compressor comprising a flexible member carried by the needle arm, one end of which is attached to the needle side of the frame, and the other end to the shock-forming mechanism and adapted to be drawn about the shock upon operation of the needle to compress the shock.

11. A sheaf shocker comprising a frame, a shock former carried by the frame, shock holding means carried by the frame, shock-tying means, a shock compressing member comprising a yielding, flexible cable connection attached to the shock former at one end and having its other end attached to the shocker frame, and means for tightening the shock compressing member on the side of the shock to compress it during the tying operation.

12. A sheaf shocker comprising a frame, shock-forming means and a shock compressor consisting of a flexible connection attached to the frame and to the shock-forming means, and means for tightening the intermediate section of the flexible connection about the shock for compressing the shock.

13. A sheaf shocker and tier attachment comprising a frame, a shock former carried by the frame, a shock compressor including a flexible member attached to the frame at one end and adapted to engage about the side of a shock, yielding means attached to the other end of the flexible member and to the shock former, and means operable by the tier attachment to tighten the compressor about the side of the shock.

14. A shocker and tier attachment including a shock upender, a butt support independent of the shock upender, and a shock compressor between the upender and butt support and co-operating therewith.

15. A sheaf shocker and tier attachment including a compressor, a shock upender, a butt support independent of the shock upender, and a shock former between the upender and butt support and co-operating therewith.

16. In a sheaf shocker, a shock upender, a shock butt support, a double acting crank for operating the shock upender, and means operably connecting the butt support with the double acting crank.

17. A shocker comprising a frame and shock-forming mechanism carried by the frame, a conveyor for conveying bundles of grain to the shocker, means for kicking the bundles from the conveyor into the shock-forming mechanism, and a bundle distributor to guide the bundles into different positions in the shock-forming mechanism.

18. A shocker comprising a frame and shock-forming mechanism carried by the frame, a conveyor for conveying bundles of grain to the shocker, means for kicking the bundles from the conveyor into the shock-forming mechanism, and a bundle distributor to guide the bundles into different positions in the shock-forming mechanism, said distributor comprising downwardly disposed guide means above the shock-forming mechanism and means for intermittently changing the position of the guide means.

19. A shocker for binders including a frame, a conveyor for carrying bundles heads first to the shocker, a bundle kick-in device for delivering the bundles from the conveyor to the shock-forming mechanism, and a trip dog holder and arm actuated by the bundles to cause the bundle kick-in device to operate.

20. A shocker for binders comprising a frame, a shock-forming mechanism carried by the frame including a shock upender, a slow and fast speed driving mechanism for the shock upender, and a single chain drive for the slow and fast speed mechanism.

21. A shocker for binders comprising a frame, a shock-forming mechanism carried by the frame, a bundle conveyor, a bundle kick-in for delivering the bundles from the conveyor to the shock-forming mechanism, a bundle counter wheel, a shock tier attachment and compressor, and a single chain drive for conveying power to the bundle kick-in, bundle counter wheel, tier attachment and compressor.

22. A shocker for binders comprising a frame, a shock-forming mechanism carried by the frame, a shock tier and compressor, a slow speed upender, and means to increase the speed of the upender to get it away from the shock fast when the shock is on end.

23. In a sheaf shocker, a twine tension device, a needle with an arm extension, and a flexible connection between the arm extension and the twine tension to release the tension device on the twine when not tying and to put the tension on the twine while tying the shock.

24. A sheaf shocker comprising shock-forming mechanism, means for conducting bundles endwise, means for delivering bundles sideways into the shock-forming mechanism, bundle counting mechanism, means for spacing the bundles, twine tensioning, tying and releasing mechanism, a shock compressor, and variable speed shock-upending mechanism.

In testimony whereof I affix my signature.

JAMES A. McELROY.